United States Patent
Yoshida

(10) Patent No.: US 8,920,994 B2
(45) Date of Patent: Dec. 30, 2014

(54) FUEL CELL SYSTEM

(75) Inventor: Michio Yoshida, Miyoshi (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 117 days.

(21) Appl. No.: 13/383,126

(22) PCT Filed: Jul. 10, 2009

(86) PCT No.: PCT/JP2009/062596
§ 371 (c)(1),
(2), (4) Date: Jan. 9, 2012

(87) PCT Pub. No.: WO2011/004493
PCT Pub. Date: Jan. 13, 2011

(65) Prior Publication Data
US 2012/0115057 A1    May 10, 2012

(51) Int. Cl.
*H01M 8/04* (2006.01)
*H01M 8/10* (2006.01)

(52) U.S. Cl.
CPC ...... *H01M 8/04619* (2013.01); *H01M 8/04559* (2013.01); *H01M 8/0488* (2013.01); *H01M 8/0494* (2013.01); *H01M 2008/1095* (2013.01); *H01M 2250/20* (2013.01); *Y02T 90/32* (2013.01); *Y02E 60/50* (2013.01)
USPC .......................... 429/430; 429/431; 429/535

(58) Field of Classification Search
USPC ......... 429/428, 429, 430, 431, 432, 433, 443, 429/517, 535; 427/115
See application file for complete search history.

(56) References Cited

U.S. PATENT DOCUMENTS

2004/0219399 A1 *  11/2004  Zhu et al. .................. 429/13

FOREIGN PATENT DOCUMENTS

| JP | 2006-147234 A | 6/2006 |
|---|---|---|
| JP | 2007-318938 A | 12/2007 |
| JP | 2008/152950 A | 12/2008 |
| JP | 2009-070574 A | 4/2009 |
| JP | 2009-117074 A1 | 5/2009 |
| WO | 2008/099743 A1 | 8/2008 |
| WO | 2008/152950 A1 | 12/2008 |

OTHER PUBLICATIONS

Translation of International Preliminary Report on Patentability of PCT/JP2009/062596.
International Search Report mailed Oct. 20, 2009 of PCT/JP2009/062596.

* cited by examiner

*Primary Examiner* — Mark F Huff
*Assistant Examiner* — Omar Kekia
(74) *Attorney, Agent, or Firm* — Kenyon & Kenyon LLP

(57) ABSTRACT

A fuel cell system comprising a fuel cell and a motor connected to the fuel cell, and also comprising a converter connected between the fuel cell and the motor, the converter adjusting output of the fuel cell to output to the motor, and a controller that controls the fuel cell and the converter. The controller outputs, to the converter, request power or a request voltage based on an operation state of the fuel cell, and the converter selectively performs an output feedback control that performs an adjustment of supply power to be output to the motor such that the output request power is satisfied or a voltage feedback control that performs an adjustment of an output voltage to be output to the motor such that the output request voltage is satisfied.

1 Claim, 5 Drawing Sheets

FUEL CELL SYSTEM

This is a 371 national phase application of PCT/JP2009/062596 filed 10 Jul. 2009, the contents of which are incorporated herein by reference.

TECHNICAL FIELD

The present invention relates to a fuel cell system comprising a fuel cell and a load connected to the fuel cell.

BACKGROUND ART

As a fuel cell system comprising a fuel cell and a load connected to the fuel cell, the following system is known, a system that: raises the output voltage of the fuel cell with a first DC/DC converter and outputs to the load; when the power needed for the load is insufficient only with the output of the fuel cell, outputs the shortage to the load from the storage device through a second DC/DC converter; and when the output power of the fuel cell exceeds the power of the load, supplies power from the fuel cell to the storage device through the first DC/DC converter and the second DC/DC converter and charges the storage device (for example, see Patent Document 1).

The control device in the fuel cell system disclosed in Patent Document 1 below calculates the target power of the motor as the load, calculates the target voltage of the motor in accordance with the target power, calculates the target output current of the fuel cell, feedback-controls the target output current as the target current of the first DC/DC converter, and feedback-controls the target voltage of the motor as the target voltage of the second DC/DC converter.

PRIOR ART REFERENCES

Patent Document

Patent Document 1: Japanese laid-open patent publication No. 2007-318938

SUMMARY OF THE INVENTION

Problem to be Solved by the Invention

Since the technique disclosed in the above Patent Document 1 performs a feedback control by calculating the target voltage and target current in accordance with the target power, a so-called I-V estimation which estimates the relationship between the voltage and the current in the fuel cell is necessary. Since the target voltage and target current are calculated based on this I-V estimation, there may be a divergence occurring between the request power (command power) and the actual supply power (actual power), for example, when the accuracy of the I-V estimation is low. Specifically, when the target voltage and the target current in accordance with the command power are determined based on I-V estimation and the target voltage is directed to be output to the DC/DC converter, even if the target voltage may be output, the current that is different from the corresponding target current would be output if the accuracy of I-V estimation is low, and thereby resulting in the actual power being different from the command power. Therefore, it is very important for the accuracy of I-V estimation to be improved.

In order to improve the accuracy of I-V estimation, a repetitive high-speed operation is considered to increase the learning cycle of I-V estimation. However, the present inventors have found out that even if such high-speed operation is performed, noise and capacitance components of the fuel cell may be picked up, and it is difficult to accurately operate the actual I-V characteristics of the fuel cell.

The present invention has been made in light of such problems, and its object is to provide a fuel cell system that is capable of suppressing the divergence between the request power (command power) and the actual supply power (actual power).

Means for Solving the Problem

In order to solve the problem described above, a fuel cell system according to the present invention includes a fuel cell and a load connected to the fuel cell, the fuel cell system comprising: a converter connected between the fuel cell and the load, the converter adjusting output of the fuel cell to output to the load; and a control unit that controls the fuel cell and the converter. The control unit outputs, to the converter, request power or a request voltage based on an operation state of the fuel cell, and the converter selectively performs an output feedback control that performs an adjustment of supply power to be output to the load such that the output request power is satisfied or a voltage feedback control that performs an adjustment of an output voltage to be output to the load such that the output request voltage is satisfied.

According to the fuel cell system according to the present invention, the control unit that controls the fuel cell and the converter outputs, to the converter, request power or a request voltage based on an operation state of the fuel cell, and thus the request power or the request voltage can be commanded to be output to the converter in accordance with the operation state of the fuel cell. When the request power is output, the converter performs an output feedback control that performs an adjustment of supply power to be output to the load such that the request power is satisfied, thereby enabling a high-speed and highly-accurate supply power control to be performed by adjusting the voltage in a manner such that the request power and supply power are directly matched, without having to calculate the target voltage through I-V estimation. In the present invention, this output feedback control is performed selectively with the voltage feedback control. The voltage feedback control performs an adjustment of an output voltage to be output to the load such that the request voltage is satisfied, thereby enabling the voltage adjustment to be performed in accordance with the operation state of the fuel cell. For example, during intermittent operation, since power is not extracted from the fuel cell intentionally, the control may diverge in output feedback control. However, such operation state may also be handled by selectively performing the voltage feedback control as in the present invention.

Effect of the Invention

According to the present invention, a fuel cell system that is capable of suppressing the divergence between the request power (command power) and the actual supply power (actual power), is provided.

MODE FOR CARRYING OUT THE INVENTION

Figure 1:
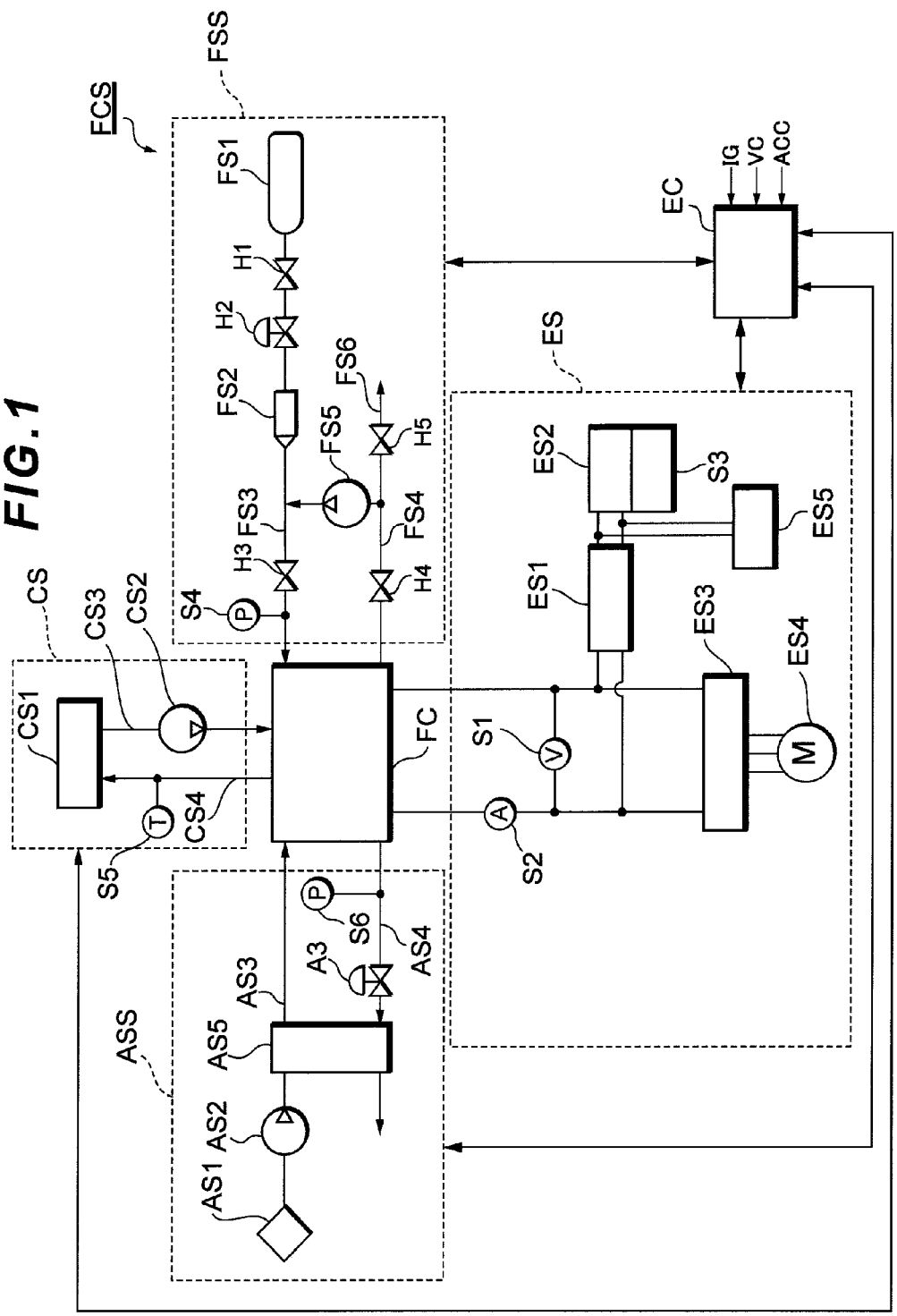
FIG. 1 is a diagram showing a configuration of a fuel cell system which is an embodiment of the present invention.

An embodiment of the present invention will be described below with reference to the attached drawings. In order to easily understand the descriptions, corresponding reference numerals are assigned to corresponding components wherever possible in each drawing and redundant descriptions will be omitted.

Firstly, a fuel cell system FCS mounted in a fuel cell vehicle which is the embodiment of the present invention will be described with reference to FIG. 1. FIG. 1 is a diagram showing a system configuration of a fuel cell system FCS which serves as an on-vehicle power source system of a fuel cell vehicle. The fuel cell system FCS can be mounted in vehicles such as fuel cell hybrid vehicles (FCHV), electric vehicles and hybrid vehicles.

The fuel cell system FCS comprises a fuel cell FC, an oxidant gas supply system ASS, a fuel gas supply system FSS, a power system ES, a cooling system CS and a controller EC. The fuel cell FC is supplied with a reactant gas (fuel gas, oxidant gas) to generate power. The oxidant gas supply system ASS is a system for supplying air as an oxidant gas to the fuel cell FC. The fuel gas supply system FSS is a system for supplying hydrogen gas as a fuel gas to the fuel cell FC. The power system ES is a system for controlling charge/discharge of the power. The cooling system CS is a system for cooling the fuel cell FC. The controller EC is a controller that centrally controls the entire fuel cell system FCS.

The fuel cell FC is configured as a solid polymer electrolyte cell stack in which a plurality of cells (a single battery comprising an anode, cathode and electrolyte (generator)) is stacked in series. In the fuel cell FC, in normal operation, an oxidization reaction represented as the below formula (1) occurs at the anode, and a reduction reaction represented as the below formula (2) occurs at the cathode. An electrogenic/electromotive reaction represented as the below formula (3) occurs in the entire fuel FC.

$$H_2 \rightarrow 2H^+ + 2e^- \tag{1}$$

$$(1/2)O_2 + 2H^+ + 2e^- \rightarrow H_2O \tag{2}$$

$$H_2 + (1/2)O_2 \rightarrow H_2O \tag{3}$$

The oxidant gas supply system ASS includes an oxidant gas flow path AS3 and an oxidant off-gas flow path AS4. The oxidant gas flow path AS3 is a flow path in which the oxidant gas supplied to the cathode of the fuel cell FC flows. The oxidant off-gas flow path AS4 is a flow path in which the oxidant off-gas exhausted from the fuel cell FC flows.

The oxidant gas flow path AS3 is provided with an air compressor AS2 and a humidifier AS5. The air compressor AS2 is a compressor for introducing oxidant gas from the atmosphere through a filter AS1. The humidifier AS5 is a humidifier for humidifying the oxidant gas that is compressed by the air compressor AS2.

The oxidant off-gas flow path AS4 is provided with a pressure sensor S6, a backpressure regulating valve A3 and a humidifier AS5. The backpressure regulating valve A3 is a valve for regulating the supply pressure of the oxidant gas. The humidifier AS5 is provided for exchanging water between the oxidant gas (dry gas) and the oxidant-off gas (wet gas).

The fuel gas supply system FSS includes a fuel gas supply source FS1, a fuel gas flow path FS3, a circulation flow path FS4, a circulation pump FS5 and an exhaust/drain flow path FS6. The fuel gas flow path FS3 is a flow path for the fuel gas supplied from the fuel gas supply source FS1 to the anode of the fuel cell FC to flow. The circulation flow path F4 is a flow path for returning a fuel-off gas exhausted from the fuel cell FC to the fuel gas flow path FS3. The circulation pump FS5 is a pump for pumping the fuel-off gas in the circulation flow path FS4 to the fuel gas flow path FS3. The exhaust/drain flow path FS6 is a flow path that branches off from the circulation flow path FS4.

The fuel gas supply source FS1 is constituted from, for example, a high-pressure hydrogen tank and hydrogen-absorbing alloy, and the fuel gas supply source FS1 being configured to store hydrogen gas at high-pressure (e.g., 35 MPa to 70 MPa) therein. When opening a cutoff valve H1, the fuel gas flows out from the fuel gas supply source FS1 into the fuel gas flow path FS3. The fuel gas is decompressed to, for example, 200 kPa by a regulator H2 and injector FS2, and supplied to the fuel cell FC.

The fuel gas flow path FS3 is provided with a cutoff valve H1, a regulator H2, an injector FS2, a cutoff valve H3 and a pressure sensor S4. The cutoff valve H1 is a valve for shutting off or allowing the supply of fuel gas from the fuel gas supply source FS1. The regulator H2 regulates the pressure of the fuel gas. The injector FS2 controls the amount of supply of the fuel gas to the fuel cell FC. The cutoff valve H3 is a valve for shutting off the supply of the fuel gas to the fuel cell FC.

The regulator H2 is a device for regulating the pressure at its upstream side (primary pressure) to a preset secondary pressure, and it is constituted by, for example, a mechanical pressure-reducing valve which reduces the primary pressure. The mechanical pressure-reducing valve has a configuration in which: a casing having a backpressure chamber and a pressure regulating chamber separated by a diaphragm is provided; and, with the backpressure in the backpressure chamber, the primary pressure is reduced to a predetermined pressure in the pressure regulating chamber, thereby obtaining the secondary pressure. The regulator H2 is arranged upstream of the injector FS2, thereby the pressure at the upstream of the injector FS2 can be reduced effectively.

The injector FS2 is an electromagnetic drive type on-off valve having a configuration in which a valve body is directly driven with an electromagnetic driving force with a predetermined drive period so as to be separated from a valve seat, thereby regulating the gas flow rate and gas pressure. The injector FS2 comprises a valve seat having an injection hole through which gas fuel such as a fuel gas is injected, a nozzle body for supplying and guiding the gas fuel to the injection hole; and a valve body which is held to be contained in a movable manner in an axial direction (gas flow direction) with respect to the nozzle body and which opens/closes the injection hole.

The valve body of the injector FS2 is driven by a solenoid, which is an electromagnetic device, and a gas injection period and a gas injection time of the injector FS2 can be controlled by control signals output from the controller EC. In the injector FS2, in order to supply gas at a flow rate required for the downstream, at least one of the opening area (degree of opening) and the open time of the valve body provided in a gas flow path of the injector FS2 is changed, thereby adjusting the flow rate (or hydrogen mol concentration) of the gas supplied to the downstream.

The circulation flow path FS4 is provided with a cutoff valve H4, and an exhaust/drain flow path FS6 is connected to the circulation flow path FS4. The exhaust/drain flow path FS6 is provided with an exhaust/drain valve H5. The exhaust/drain valve H5 is a valve for discharging the fuel-off gas containing impurities and moisture in the circulation flow path FS4 by operating in accordance with the commands from the controller EC. By opening the exhaust/drain valve H5, the concentration of the impurities contained in the fuel-off gas in the circulation flow path FS4 decreases, which enables the hydrogen concentration of the fuel-off gas circulating in a circulation system to increase.

The fuel-off gas discharged through the exhaust/drain valve H5 is mixed with the oxidant-off gas flowing in the oxidant-off gas flow path AS4, and the mixture is diluted with a diluter (not shown). The circulation pump FS5 circulates and supplies the fuel-off gas in the circulation system to the fuel cell FC by a motor drive.

The power system ES includes a DC/DC converter ES1, a battery ES2, a traction inverter ES3, a traction motor ES4 and auxiliary devices ES5. The fuel cell system FCS is configured as a parallel hybrid system in which the DC/DC converter ES1 and the traction inverter ES3 are connected in parallel with the fuel cell FC.

The DC/DC converter ES1 has a function of increasing a direct-current voltage supplied from the battery ES2 and outputting the resultant direct-current voltage to the traction inverter ES3, and a function of decreasing the direct-current power generated by the fuel cell FC or the regenerative power collected by the traction motor ES4 via regenerative braking and charging the battery ES2 with the resultant power. These functions of the DC/DC converter ES1 control the charge and discharge of the battery ES2. The voltage conversion control by the DC/DC converter ES1 controls an operation point (output terminal voltage and output current) of the fuel cell FC. The fuel cell FC is provided with a voltage sensor S1 and a current sensor S2. The voltage sensor S1 is a sensor for detecting the output terminal voltage of the fuel cell FC. The current sensor S2 is a sensor for detecting the output current of the fuel cell FC.

The battery ES2 functions as a storage source of surplus power, a storage source of regenerative energy during regenerative braking, and an energy buffer during a load variation as a result of acceleration or deceleration of a fuel cell vehicle. The battery ES2 is preferably constituted by a secondary battery such as nickel/cadmium storage battery, a nickel/hydrogen storage battery, or a lithium secondary battery. The battery ES2 is provided with an SOC sensor S3 for detecting the SOC (state of charge).

The traction inverter ES3 is, for example, a PWM inverter driven by a pulse width modulation method. In accordance with control commands from the controller EC, the traction inverter ES3 converts a direct-current voltage output from the fuel cell FC or the battery ES2 into a three-phase AC voltage, thereby controlling a rotation torque of the traction motor ES4. The traction motor ES4 is, for example, a three-phase AC motor, and constitutes a power source of the fuel cell vehicle.

The auxiliary device ES5 is a generic name for motors arranged in the respective units in the fuel cell system FCS (e.g., power sources for pumps, etc.), inverters for driving these motors, and various vehicle-mounted auxiliary devices (e.g., an air compressor, injector, cooling water circulation pump and radiator).

The cooling system CS includes a radiator CS1, a coolant pump CS2, a coolant forward path CS3 and a coolant return path CS4. The radiator CS1 discharges heat of the coolant for cooling the fuel cell FC to cool the fuel cell FC. The coolant pump CS2 is a pump for circulating the coolant between the fuel cell FC and the radiator CS1. The coolant forward path CS3 is a flow path that connects the radiator CS1 and the fuel cell FC, and the coolant forward path CS3 is provided with a coolant pump CS2. Driving the coolant pump CS2 allows the coolant to flow from the radiator CS1 to the fuel cell FC through the coolant forward path CS3. The coolant return path CS4 is a flow path that connects the fuel cell FC and the radiator CS1, and the coolant return path CS4 is provided with a water temperature sensor S5. Driving the coolant pump CS2 allows the coolant that cooled the fuel cell FC to flow back to the radiator CS1.

The controller EC (control unit) is a computer system which includes a CPU, ROM, RAM and an input/output interface, and controls the respective units of the fuel cell system FCS. For example, when an ignition signal IG output from an ignition switch is received, the controller EC starts the operation of the fuel cell system FCS. Subsequently, the controller EC obtains the request power of the entire fuel cell system FCS based on an acceleration-opening-degree signal ACC output from an acceleration sensor, a vehicle speed signal VC output from a vehicle speed sensor, etc. The request power of the entire fuel cell system FCS is a total value of vehicle driving power and the auxiliary-machine power.

The auxiliary-device power includes, e.g., power consumed by vehicle-mounted auxiliary devices (humidifier, air compressor, hydrogen pump, cooing water circulation pump, etc.), power consumed by devices necessary for vehicle driving (change gear, wheel control device, steering device, suspension device, etc.), and power consumed by devices arranged in an occupant space (air-conditioning device, illumination device, audio equipment, etc.).

The controller EC determines an output power distribution between the fuel cell FC and the battery ES2. In addition, the controller EC controls the oxidant gas supply system ASS and the fuel gas supply system FSS so that the amount of power generated by the fuel cell FC corresponds to the target power, and also outputs an indicator signal to the DC/DC converter ES1, thereby performing a converter control by the DC/DC converter ES1 and controlling the operation point (output terminal voltage and output current) of the fuel cell FC. Moreover, in order to obtain a target torque in accordance with an acceleration opening degree, the controller EC outputs, for example, respective AC voltage command values of a U-phase, a V-phase and a W-phase as switching commands to the traction inverter ES3, and controls the output torque and revolution speed of the traction motor ES4. Additionally, the controller EC controls the cooling system CS to control the fuel cell FC to be at a suitable temperature.

Figure 2:
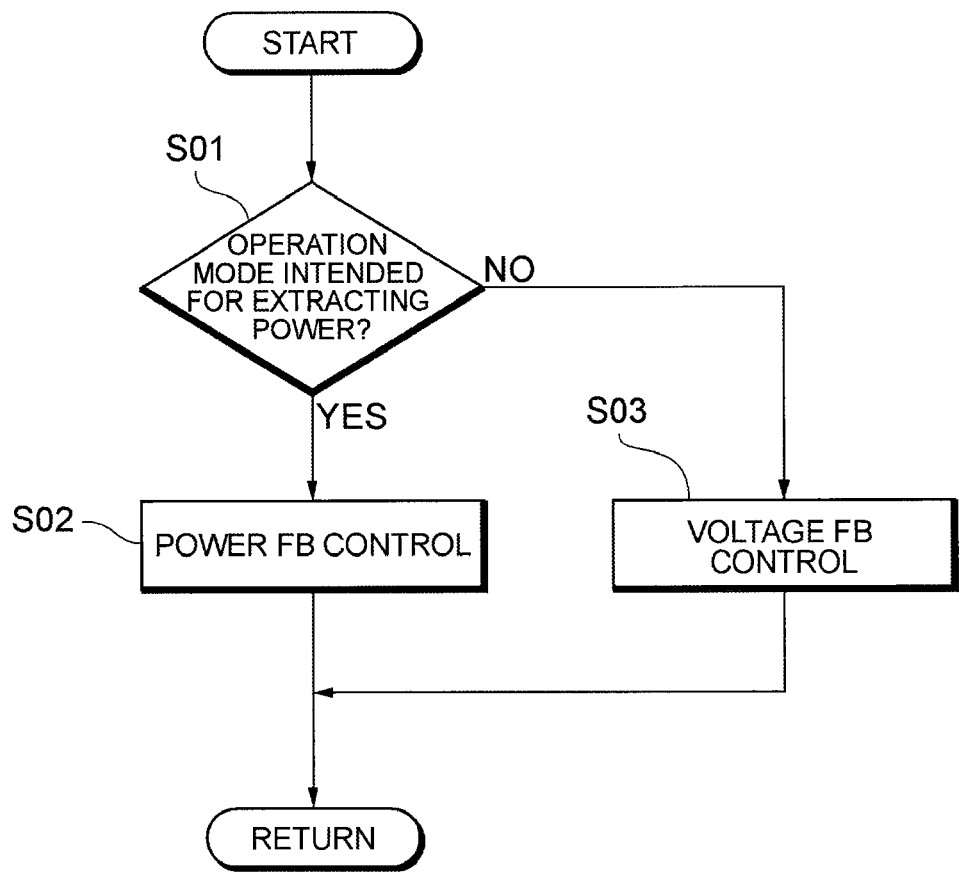
FIG. 2 is a flowchart for an output control of the fuel cell system shown in FIG. 1.
Figure 3:
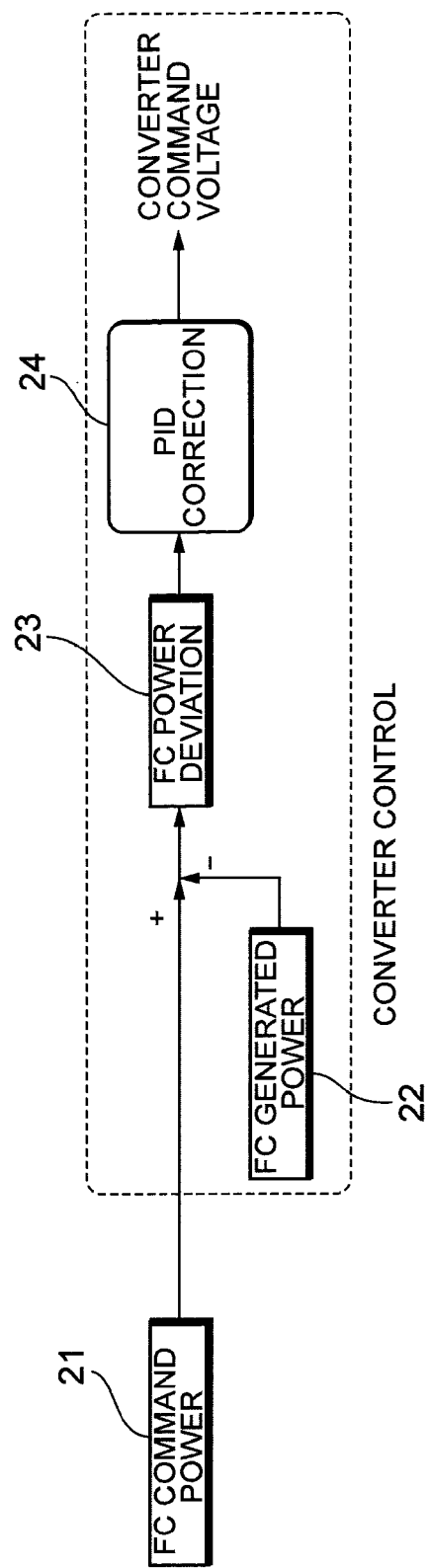
FIG. 3 is a block diagram for explaining a power feedback control.
Figure 4:
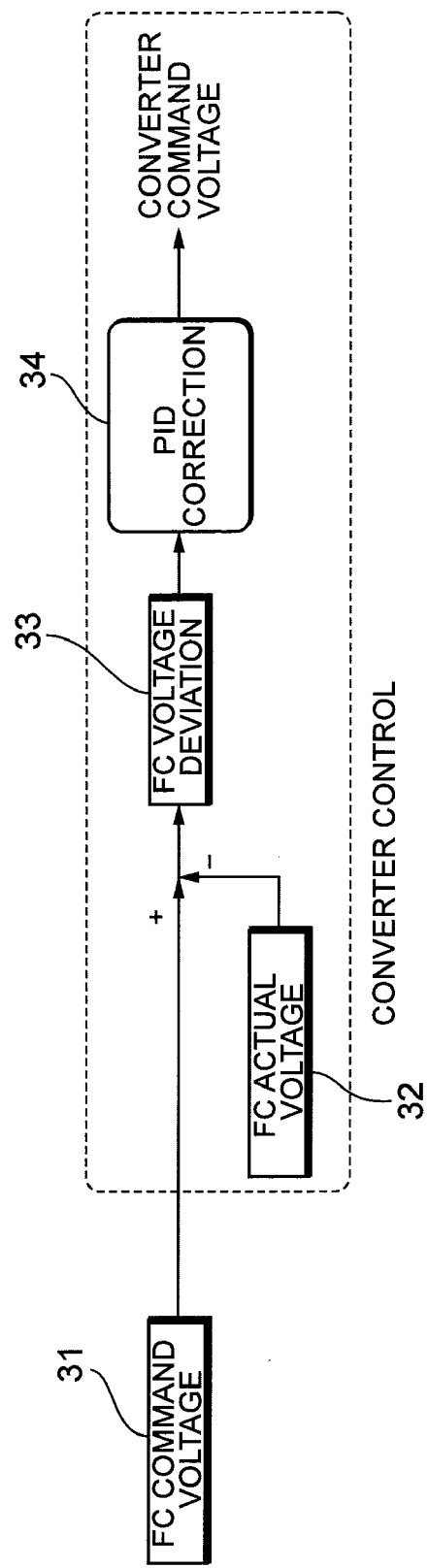
FIG. 4 is a block diagram for explaining a voltage feedback control.
Figure 5:
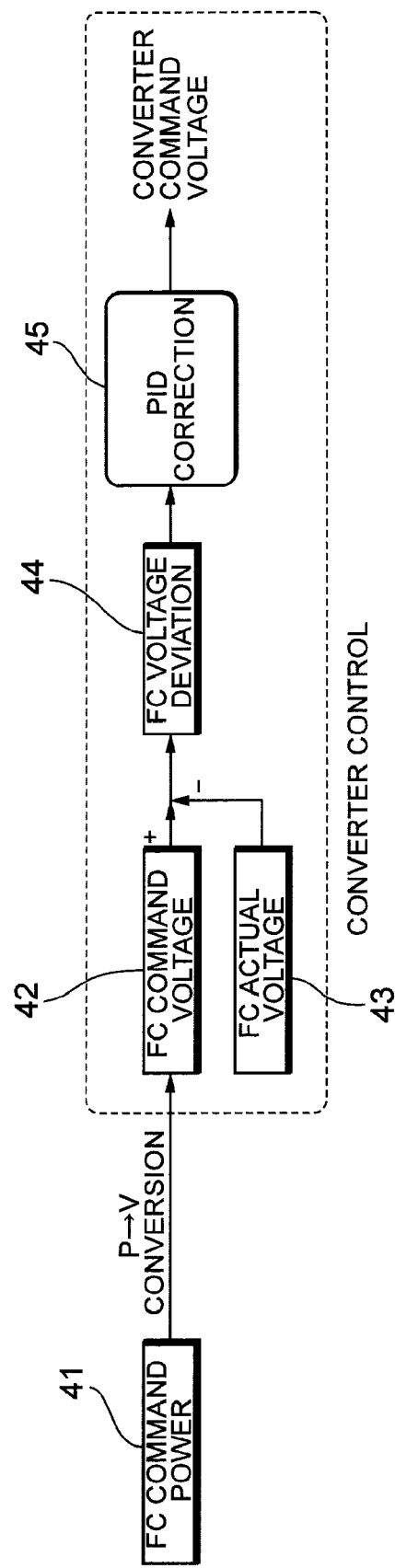
FIG. 5 is a block diagram for explaining the conventional feedback control.

Next, referring to FIGS. 2, 3, 4 and 5, an operation point control of the fuel cell FC by the controller EC and the DC/DC converter ES1 will be described below. FIG. 2 is a flow chart showing an operation point control of the fuel cell FC by the controller EC and the DC/DC converter ES1. FIG. 3 is a block diagram for explaining a power feedback control. FIG. 4 is a block diagram for explaining a voltage feedback control. FIG. 5 is a block diagram for explaining the conventional feedback control.

In Step S01, the controller EC judges whether or not the current operation mode is an operation mode intended for extracting power from the fuel cell FC. The operation mode intended for extracting power from the fuel cell FC is referred to as the normal operation mode. On the other hand, the operation mode not intended for extracting power from the fuel cell FC is an operation mode such as an intermittent operation mode, a start and stop mode and a below zero start mode. When the current operation mode is the operation mode intended for extracting power from the fuel cell FC, the process proceeds to Step S02, and when the current operation mode is the operation mode not intended for extracting power from the fuel cell FC, the process proceeds to Step S03.

In Step S02, FC command power as the request power is output from the controller EC to the DC/DC converter ES1, and the DC/DC converter ES1 performs a power feedback control. As shown in FIG. 3, the DC/DC converter ES1 calculates the FC power deviation 23 (=FC command power 21−FC generated power 22) by the deviation between the FC command power 21 output from the controller EC and the FC generated power 22 of the fuel cell FC. PID correction 24 (proportional correction (P correction), integral correction (I correction) and differential correction (D correction)) is performed on this FC power deviation 23, and a converter command voltage is output as a controlled variable.

In the present embodiment, FC command power 21 as the request power is output as described above, and a power feedback control is performed based on the deviation between the FC command power 21 and the FC generated power 22. Thus, high-speed and highly-accurate power control can be realized without performing estimation. For comparison, the conventional feedback control will be described below with reference to FIG. 5. As shown in FIG. 5, based on FC command power 41 output from the controller, the DC/DC converter performs a conversion from power to voltage based on I-V estimation and calculates the FC command voltage 42. By the deviation between the FC command voltage 42 and the FC actual voltage 43, the FC voltage deviation 44 (=FC command voltage−FC actual voltage) is calculated. PID correction 45 is performed on this FC voltage deviation 44, and a converter command voltage is output as a controlled variable. Accordingly, if the accuracy of I-V estimation is low, the FC command voltage 42 that appropriately corresponds to the FC command power 41 cannot be calculated, and consequently, the would be a divergence between the FC command power 41 and FC actual generated power. The FC voltage deviation 44 is calculated based on the input diverged in such a way, and an accurate control cannot be performed even if the PID correction 45 is performed and the converter command voltage is output. If the accuracy of I-V estimation is low, the result would be the same even if the operation speed is made faster, and the power error cannot be overcome. With respect to this, in the present embodiment, I-V estimation is unnecessary in the first place as described above, and thus a highly-accurate power control can be realized.

Referring back to FIG. 2, in Step S03, FC command voltage as a request voltage based on the operation state of the fuel cell FC is output from the controller EC to the DC/DC converter ES1, and the DC/DC converter ES1 performs a voltage feedback control. As described above, the process of Step S03 is performed during an operation mode not intended for extracting power from the fuel cell FC (intermittent operation mode, start and stop mode, below zero start mode, etc.). If the power feedback control is performed in this case, for example, in a case of an intermittent operation mode, the amount of power to be generated is not increased since no fuel gas is supplied to the fuel cell FC even if the operation point voltage is changed by the DC/DC converter ES1, thereby causing a possibility for the integral term (I correction term) during PID control to diverge. The present embodiment focuses on the fact that no detailed control for power is needed in the first place when there is no intention for extracting power from the fuel cell FC, and performs a voltage feedback control.

More specifically, as shown in FIG. 4, the DC/DC converter ES1 calculates the FC voltage deviation 33 (=FC command voltage 31−FC actual voltage 32) by the deviation between the FC command voltage 31 output from the controller EC and the FC actual voltage 32 of the fuel cell FC. PID correction 34 (proportional correction (P correction), integral correction (I correction) and differential correction (D correction)) is performed on this FC voltage deviation 33, and a converter command voltage is output as a controlled variable.

DESCRIPTION OF REFERENCE NUMERALS

FCS . . . Fuel cell system; FC . . . Fuel cell; ASS . . . Oxidant gas supply system; AS1 . . . Filter; AS2 . . . Air compressor; AS3 . . . Oxidant gas flow path; AS4 . . . Oxidant off-gas flow path; AS5 . . . Humidifier; A3 . . . Backpressure regulating valve; CS . . . Cooling system; CS1 . . . Radiator; CS2 . . . Coolant pump; CS3 . . . Coolant forward path; CS4 . . . Coolant return path; FSS . . . Fuel gas supply system; FS1 . . . Fuel gas supply source; FS2 . . . Injector; FS3 . . . Fuel gas flow path; FS4 . . . Circulation flow path; FSS . . . Circulation pump; FS6 . . . Exhaust/drain flow path; H1 . . . Cutoff valve; H2 . . . Regulator; H3 . . . Cutoff valve; H4 . . . Cutoff valve; H5 . . . Exhaust/drain valve; ES . . . Power system; ES1 . . . DC/DC converter; ES2 . . . Battery; ES3 . . . Traction inverter; ES4 . . . Traction motor; ESS . . . Auxiliary device; EC . . . Controller; S1 . . . Voltage sensor; S2 . . . Current sensor; S3 . . . SOC sensor; S4, S6: Pressure sensor; S5 . . . Water temperature sensor; ACC . . . Accelerator open degree signal; IG . . . Ignition signal; VC . . . Vehicle speed signal.

What is claimed is:

1. A fuel cell system including a fuel cell and a load connected to the fuel cell, the fuel cell system comprising:
a converter connected between the fuel cell and the load, the converter adjusting output of the fuel cell to output to the load; and
a control unit that controls the fuel cell and the converter, wherein the control unit outputs, to the converter, request power or a request voltage based on an operation state of the fuel cell, and
wherein the converter selectively performs an output feedback control or a voltage feedback control, and
wherein the control unit is programmed to select between the output feedback control that performs an adjustment of supply power to be output to the load based on a deviation between the output request power and generated power of the fuel cell and the voltage feedback control that performs an adjustment of an output voltage to be output to the load based on a deviation between the output request voltage and an actual voltage of the fuel cell depending on whether or not the fuel cell operates in an operation mode that is intended for extracting power from the fuel cell.

* * * * *